(12) United States Patent
Decime

(10) Patent No.: US 6,728,761 B2
(45) Date of Patent: Apr. 27, 2004

(54) SYSTEM AND METHOD FOR TRACKING USAGE OF MULTIPLE RESOURCES BY REQUESTING FOR RETRIEVING A NON-EXISTENT FILES, AND CAUSING QUERY INFORMATION TO BE STORED IN AN ERROR LOG

(75) Inventor: Jerry B. Decime, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 384 days.

(21) Appl. No.: 09/757,277

(22) Filed: Jan. 8, 2001

(65) Prior Publication Data

US 2002/0059193 A1 May 16, 2002

Related U.S. Application Data

(63) Continuation-in-part of application No. 09/687,794, filed on Oct. 12, 2000.

(51) Int. Cl.[7] ............................................. G06F 15/16
(52) U.S. Cl. ...................... 709/217; 709/203; 709/206; 709/224
(58) Field of Search ................................ 709/200, 203, 709/217–218, 223–224, 206; 707/3, 100, 104.1

(56) References Cited

U.S. PATENT DOCUMENTS

| | | | | |
|---|---|---|---|---|
| 5,701,446 A | * | 12/1997 | Abali et al. ................. 707/100 |
| 6,026,440 A | * | 2/2000 | Shrader et al. ............. 709/224 |
| 6,370,571 B1 | * | 4/2002 | Medin, Jr. .................. 709/218 |
| 6,397,244 B1 | * | 5/2002 | Morimoto et al. .......... 709/200 |
| 6,433,795 B1 | * | 8/2002 | MacNaughton et al. .... 345/738 |
| 6,438,716 B1 | * | 8/2002 | Snover ........................ 714/57 |
| 6,466,966 B1 | * | 10/2002 | Kirsch et al. ............... 709/203 |
| 6,513,031 B1 | * | 1/2003 | Fries et al. .................... 707/3 |
| 6,523,037 B1 | * | 2/2003 | Monahan et al. ............ 707/10 |
| 6,535,889 B1 | * | 3/2003 | Headrick et al. ........ 707/104.1 |
| 2002/0083013 A1 | * | 6/2002 | Rollins et al. ............... 705/76 |
| 2002/0099812 A1 | * | 7/2002 | Davis et al. ................. 709/224 |
| 2002/0133554 A1 | * | 9/2002 | Checkoway et al. ........ 709/206 |
| 2002/0178232 A1 | * | 11/2002 | Ferguson .................... 709/217 |

\* cited by examiner

*Primary Examiner*—Hosain Alam
*Assistant Examiner*—Oanh L Duong

(57) ABSTRACT

The present invention is directed to a method for tracking the use of an e-mail support tool. In one embodiment, the method initially involves eliciting from a user a query in connection with providing the e-mail support service. A corresponding e-mail query is then generated from the elicited query. The generated e-mail query includes a command having embedded query information that is associated with the user's query. The e-mail query is then made available to an agent for responding to the user's query by replying to the e-mail query. In replying to the e-mail query, the agent with a computer opens the e-mail query thereby executing the command. The execution of the command causes the agent computer to transmit to a server, designated within the command, a request that includes the embedded query information. The query information is then stored in a database in response to the fact that the request cannot be processed by the designated server. In another embodiment, the command may be executed by a user computer when the user opens the agent's reply to the e-mail query.

23 Claims, 14 Drawing Sheets

```
AppServer[1]-Notepad                                    _ □ ×
File   Edit   View   Go   Favorites   Help
<!-- Closes second to last table, table 2-->
</Table>
</TD>
</TR>
<!-- Closes outermost table -->
</Table>
<!-- NO TABLE ZONE -->
<!-- Begin footer table -->
<TABLE BORDER=0 CELLSPACING=0 cellpadding=0 width=620 NOF=LY>
<TR VALIGN=TOP ALIGN=LEFT>
<TD HEIGHT =73>
</TD>
</TR>
<TR VALIGN=TOP ALIGN=LEFT >
<TD WIDTH=620 HEIGHT=45 WIDTH=620 SRC="http://forum7.support.hp.com:5050/language_en_ima
<br>

<IMG HEIGHT =1 WIDTH=1 SRC="http://hpcc981.external.hp.com:5050/
broken-images/appid=jforum/98/forum/index_pl//_kpq8Gfb/broken.gif"   }—210
BORDER=0>

<MAP NAME="map21">
<AREA SHAPE=RECT ALT="" COORDS="25,29,117,45" HREF="http://www.hp.com/go/PrivacyStatement">
<AREA SHAPE=RECT ALT="" COORDS="319,28,385,45" HREF="http://www.hp.com/go/termsOfUse">
<AREA SHAPE=RECT ALT="" COORDS="500,10,618,27" HREF="http://contact.external.hp.com/email/feed
</MAP>
</TD>
</TR>
</TABLE>
<!-- END footer table -->

Internet
```

*FIG. 2C*

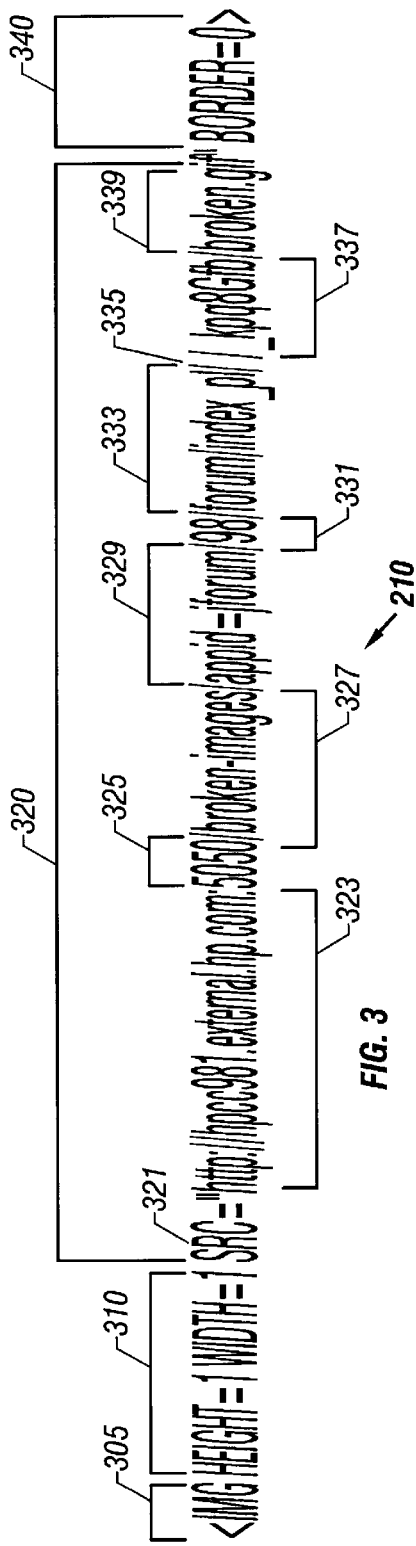

FIG. 3

| | Timestamp | Error Indicator | Affected Client | Error Type |
|---|---|---|---|---|
| 401 | [Tue Jul 25 09:12:30 2000] | [error] | [client 212.83.71.10] | request failed: error reading the headers |
| 403 | [Tue Jul 25 09:12:40 2000] | [error] | [client 134.153.101.3] | File does not exist: /var/opt/web/boi-web3/htdocs/broken-images/appid=jforum/66/forum/index_pl///Y4zgdPLm/broken.gif |
| 405 | [Tue Jul 25 09:12:44 2000] | [error] | [client 205.188.209.139] | request failed: URI too long |
| 407 | [Tue Jul 25 09:12:46 2000] | [error] | [client 209.254.245.140051] | File does not exist: /var/opt/web/boi-web3/htdocs/broken-images/appid=jforum/40/forum/show/40/11095/IuYwidFr/broken.gif |

FIG. 4

Ⓐ　Ⓑ
　　　hp cd-writer plus 8210i
　　　hp cd-writer 8220e
　　　hp cd-writer 8230e
　　　hp cd-writer plus 8250i
　　　hp cd-writer plus 9100i
　　　hp cd-writer plus 9110i
　　　hp cd-writer 9140i
　　　hp cd-writer 9150i
　　　hp cd-writer plus 9200e
　　　hp cd-writer plus 9200i
　　　hp cd-writer plus 9210e
　　　hp cd-writer plus 9210i
　　　hp cd-writer plus 9300i
　　　hp cd-writer plus 9310i
　　　hp cd-writer 9340i
　　　hp cd-writer 9350i
　　　hp cd-writer 9500i
　　　hp cd-writer 9510i
　　　hp cd-writer 9600se
　　　hp cd-writer 9600si
　　　hp cd-writer plus m820e
　　　hp cd-writer plus m8270e
Ⓒ

FIG. 7B-2

invent hp cd-writer plus 7500e e-mail support e-mail form

The information we are requesting will be used solely to fulfill your e-mail support request and does not register you as an HP customer.

744 {

\* = required field purchase data [month ▽] \* [day ▽] \* [year ▽] \* what is the product's serial number? [                    ] \*
the serial number is located on the underside of the drive tray for internal models and on the back of the drive for external models.

what operating system do you use? [select           ▽] \* if "other" please specify. [                    ]

subject of e-mail message. [                    ]

type and brand of cd media used. [                    ]

if there is an error message please specify. [                    ]

*FIG. 7C-1*

744 {
- please provide the exact problem description and any other information that can help hp assist you. [textarea] *
- first name [input] *
- last name [input] *
- e-mail address [input] *
- phone number [input] *
- country [dropdown] *

- HP will respond to technical support questions written in English on in-warranty products.
- Quality responses can be expected within 2 United States business days after HP receives your e-mail.
- E-mail questions unrelated to this product will be forwarded.

SYSTEM AND METHOD FOR TRACKING USAGE OF MULTIPLE RESOURCES BY REQUESTING FOR RETRIEVING A NON-EXISTENT FILES, AND CAUSING QUERY INFORMATION TO BE STORED IN AN ERROR LOG

The present application is a continuation-in-part of co-pending U.S. patent application Ser. No. 09/687,794, entitled "BROKEN IMAGE TRACKING," filed on Oct. 12, 2000, the disclosure of which is hereby incorporated herein by reference.

TECHNICAL FIELD

The present invention relates generally to Internet applications. In particular, the present invention relates to a system and method for tracking the use of an enterprise's commonly available resources over multiple uses for multiple sessions. More particularly, there is disclosed a system and method for keeping track of the usage of an e-mail support tool.

BACKGROUND

Web servers with web tools are commonly made available to web users through the Internet. Web tools provide numerous variety of on-line services such as sales, auctions, information services, virtual forums, customer support, and expert assistance services. It is typically desirable for web tool providers to track web user's use of their services from one session to another. Usage metrics such as time of use and specifically requested web page(s) are commonly tracked. In some systems, web tool providers offer numerous web tools (e.g., search engines, forums, help desks) within the same general web site such as with a customer support site. One or more actual servers may be used for providing one or more of these multiple web tools. In such cases, it is also desirable to track metrics (or usage parameters) such as web tool application type and particularly utilized server or servers.

Conventional tracking schemes have involved documenting usage parameters for a web tool within the actual web tool server that is providing the web tool. Unfortunately, with organizational systems that provide multiple web tools through numerous servers, this can be inefficient and difficult to carry out. User information must be separately extracted (and/or mined) from each server. Not only does this consume excessive resources, but it also makes it difficult to compare data from one web tool (or application) to another, as well as from one server to another—even when providing the same web tool.

Accordingly, it would be desirable to have an improved method and system for tracking the use of web resources, especially in systems that provide multiple web resources from multiple locations.

SUMMARY OF THE INVENTION

The present invention is directed to a method for tracking the use of multiple resources, such as an e-mail support tool, provided from different servers. In one embodiment, the method initially involves eliciting from a user a query in connection with providing the requested service. A corresponding query is then generated from the elicited query. The generated query includes a command having embedded query information that is associated with the user's query. The user's query (usually by e-mail) is then made available to an agent (which is typically a computer running a particular application, but could be a person) for responding to the user's query by replying to the e-mail query. In replying to the e-mail query, the agent opens the user's e-mail query thereby executing the command. The execution of the command causes the agent computer to transmit to a server, designated within the command, a request that includes the embedded query information. The query information is then stored in a database in response to the request not being able to be processed by the designated server. The error log of the designated server controls storing of the data. In another embodiment, the command may also be (or exclusively) executed by a user computer when the user opens the agent's reply to the e-mail query. The user's system is caused to generate a URL to a special server, the URL contains user specific information. The special server cannot retrieve the information requested by the URL since it is actually not accessible, but instead the server logs the request and retains the request as a record for further tracking.

A system for tracking web users use of an e-mail support system tool is also provided by the present invention. In one embodiment, the system generally includes an e-mail support tool server, one or more web user computers, one or more agent computers and a designated server for receiving embedded query information for tracking the service. The e-mail support tool server is operably connected to the one or more web user computers. The e-mail support tool server has an e-mail support tool program for receiving support system queries from the one or more web user computers. The e-mail support tool server generates an e-mail query from each received support system query and inserts within each e-mail query a command having embedded query information. The one or more e-mail support agent computers are operably connected to the e-mail support tool server for receiving and opening the e-mail queries. The designated server is operably connected to the one or more support agent computers. The command within each e-mail query is executed by a support agent computer when the e-mail query is opened by the computer causing the computer to transmit to the designated server a request that includes the embedded query information from the command within the e-mail query. The query information is then stored in a database in response to the request being processed by the designated server.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawing, in which:

FIG. 2C shows a portion of the source file with a BIT tag for the web page depicted in FIGS. 2A AND 2B;

FIG. 3 shows in greater detail the exemplary BIT tag of FIGS. 2A–2C;

FIG. 4 depicts an exemplary error log from one embodiment of a BIT scheme of the present invention;

FIGS. 7B-1, 7B-2, and 7B-3 show an exemplary web page for an Internet-implemented e-mail support system;

FIGS. 7C-1 and 7C-2 show a web page with an e-mail support query form generated from a user's selection of a link from the web page of FIGS. 7B-1, 7B-2, and 7B-3.

DETAILED DESCRIPTION

The present invention provides and employs a system, herein call the Broken Image Tracking ("BIT") system, for tracking user information for users of a web resource, such as a web site, web tool, or shared web application. With BIT, the web page generating program (e.g., a web tool program) inserts a "broken image" tag in various (or even all) of the web pages transmitted to a user. In general, a BIT tag is a HTML image tag (or equivalent) with a BIT URL, i.e., a URL that includes embedded user information and a broken image file designator. As used herein, a broken image file is a file that cannot be located, e.g., because it does not exist or because its directory path does not point to it. The BIT URL has a file path that directs the user's image-retrieving browser to an information gathering ("broken image") web server. With the designated broken image file in the URL, the broken image server will attempt but will not be able to find and retrieve to the browser the broken image file. This causes the broken image server to log (in its error log) the BIT URL, which includes the user information. In this way, user information can be collected and routed into a centralized repository, such as the error log within the broken image server. This can be extremely convenient—especially when relevant user information for a given web tool is being collected for users accessing the web tool through multiple implementations and/or instantiations of the web tool such as when a web tool is being implemented through various servers.

Figure 1:
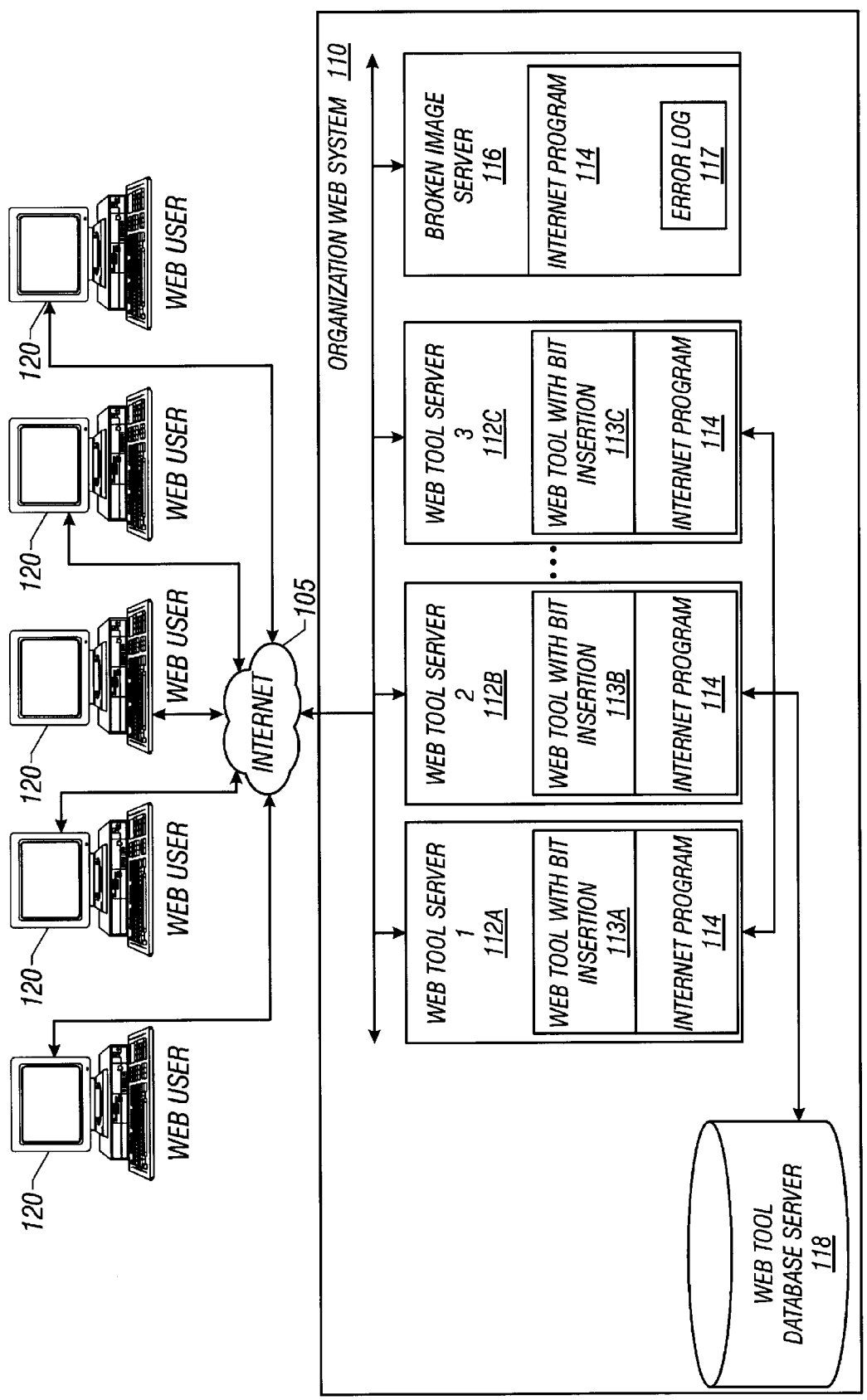
FIG. 1 shows a block diagram of one embodiment, called the broken image tracking ("BIT") system, of the present invention.

FIG. 1 shows one embodiment of a portion of an organization's (enterprise) web site system 110 of the present invention. Web site system 110 is connected, in one embodiment to multiple web user computers 120 through, for example, the portion of the Internet 105 known as the World Wide Web (the Web). In the depicted embodiment, web site system 110 generally includes web tool (application) servers 112A–112C, broken image server 116, and web tool database server 118. Each web tool server, 112A through 112C, is operably connected to the web tool (or other applications) database 118 and includes a corresponding web tool (with BIT insertion) program 113A, 113B, or 113C, respectively. Each web tool server 113 also includes an Internet (or Internet enabling) program 114. Likewise, the broken image server 116 includes an Internet program 114 having an error log 117 used for storing user information relating to web users use of the web tools 113A through 113C. Note that while three servers are shown, the system can be configured to handle many such servers, some of which may provide different functions to a user.

The Internet programs 114 enable the web tool 112A–112C and broken image server 116 to function as web servers. They may be implemented with any suitable Internet enabling software such as Apache, Microsoft IIS, and Netscape Enterprise Server. In web tool servers 112, Internet programs 114 enable web tool servers 112 to function as web servers thereby providing web users 120 with access to web tool programs 113, which include BIT insertion. On the other hand, the primary purpose of Internet program 114 in the broken image server 116 is to facilitate a centralized repository for receiving and storing BIT URLs in its error log 117. Conventional Internet enabling software, such as Apache, include error logging mechanisms, which will store the BIT URLs of the present invention in a self-generating error log.

Web tool programs 113A–113C execute and provide to web users (via Internet programs 114) a web tool (or web site) for assisting or providing information to the user in relation to an organization's business or activities. In addition, web tool programs 113A–113C include a routine (or function) for inserting a BIT tag into the web page being transferred to a web user. Web tool information and forms generated by the web tool programs 113A–113C are typically formatted in a hypertext mark-up language (HTML) and can include text, programs, graphics, video, and audio portions. Any suitable programming scheme may be used for implementing a web tool program 113. In one embodiment, a Java servlet on a Windows NT platform is used for dynamically generating the web pages with web page templates. As used herein, a servlet comprises a Java application that runs in a Web server or application server and provides server-side processing. Persons of skill in the art will recognize, however, that acceptable substitutions include but are not limited to CGI scripts, Active Server Pages (ASPs) and plug-ins written in C and C++ for specific Web servers, e.g., ISAPI, NSAPI. With this scheme, the servlet functions dynamically to generate and insert a BIT tag into each web page provided to a web user from a web tool server 112.

Web tools could include but are not limited to keyword search engines, natural language search engines, user forums, case-based expert system help desks, or any web application used to implement a particular web site. In one embodiment, the web tool servers 112 are forum servers (i.e., forum server 1, forum server 2, and forum server 3) for providing customer web users with access to a user forum (message boards, etc.) relating to a company's product or products. An example of such a user forum may be found at Hewlett Packard's www.hp.com web site in its "Customer Care Center" where the "HP User Community Forum" may be accessed for communicating with other HP customers about HP products of interest. The forum servers (of which there could be any number) are redundantly used for implementing the user forum in order to provide load balancing and to increase reliability.

Web tool database server 118 is a conventional database server for storing and providing to web tool servers 112 web tool information relating to the web tool being implemented on web tool server 112. For example, with the web tool servers being user forum servers, the database server 118 would store posted questions, question responses and the like. Web tool database server 118 can be implemented with any suitable database scheme including but not limited to flat-file, hierarchical, relational, and object-oriented databases, all well-known in the art.

Web user computers 120 can be any form of network access device, including a computer (whether wired or wireless) or Internet appliance, cell phone, pocket organizer, each with an appropriately operable web browser. Likewise, web tool servers 112, broken image server 116, and web tool database server 118 can be implemented with any suitable combination of one or more computers, including but not limited to mainframes, workstations, or personal computers, running operating systems such as Windows NT, UNIX, LINUX, or any other computer operating system. For example, a web site system may comprise one or more web tool or web site servers that perform single or various web site tasks. These servers could be implemented on one or several computers. In addition, one or more broken image servers may be used, and they can be executed in any suitable web server including in a stand-alone web server (as is depicted) or even in one of the web tool servers.

In operation, web user 120 initiates and engages in a session with the web tool in organization web system 110. In doing so, the user communicates with one or several of the servers 112A, 112B, or 112C. Within the session, the user transmits to a web tool server request for receiving and viewing desired information. Upon receiving a request, the web tool server, through its executing web tool 113, generates and transmits to the user's browser a responsive web page file containing the desired information. In one embodiment of the invention, the web tool inserts into each transmitted web page file a BIT tag having a BIT URL with user metrics relating to the user's web session. Upon receiving the web page file, the user's browser executes the web page file in order—among other—things to display a corresponding web page. In executing the web page file, the browser executes the BIT tag, which causes it to transmit the BIT URL to the broken image server 116 in an apparent attempt to retrieve therefrom the broken image file that is designated within the BIT URL. Upon receiving the BIT URL, broken image server 116 attempts to locate and send back to the browser the designated broken image file. However, server 116 will not be able to locate the file (e.g., because it doesn't exist), which causes its Internet program 114 to register an error and store in its error log 117 the BIT URL. Thus, BIT URLs associated with each web page in the session will be stored in the error log 117 of broken image server 116. Accordingly, BIT URLs associated with all of the web pages generated by the web tool servers 112A, 112B, and 112C for all web users 120 can be stored in error log 117. In this way, user information for all users using this (or any other web tool within the organization web system 110) is accumulated within the error log, which serves as a common, centralized database for storing the user information, and does so without extensive modifications to any system component or operation.

Figure 2A:
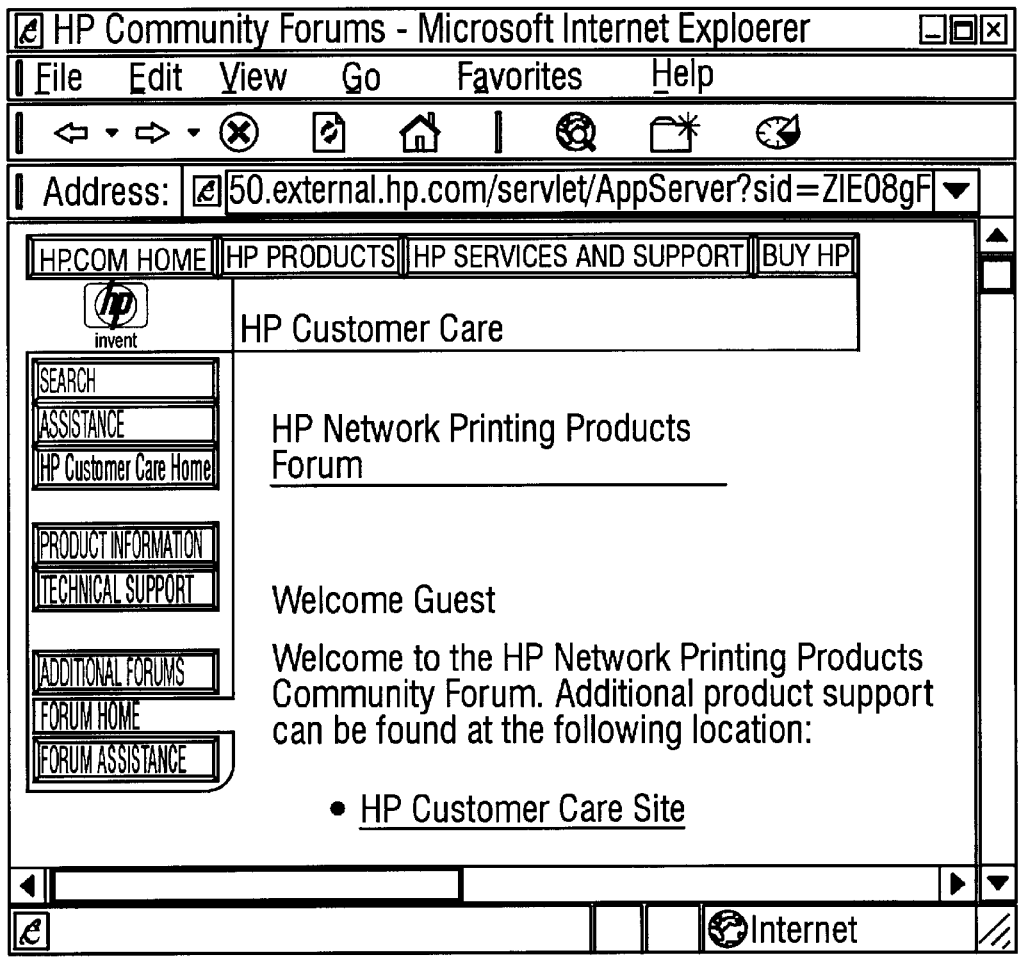
FIGS. 2A and 2B show an exemplary web page that incorporates a BIT tag of the present invention.
Figure 2B:
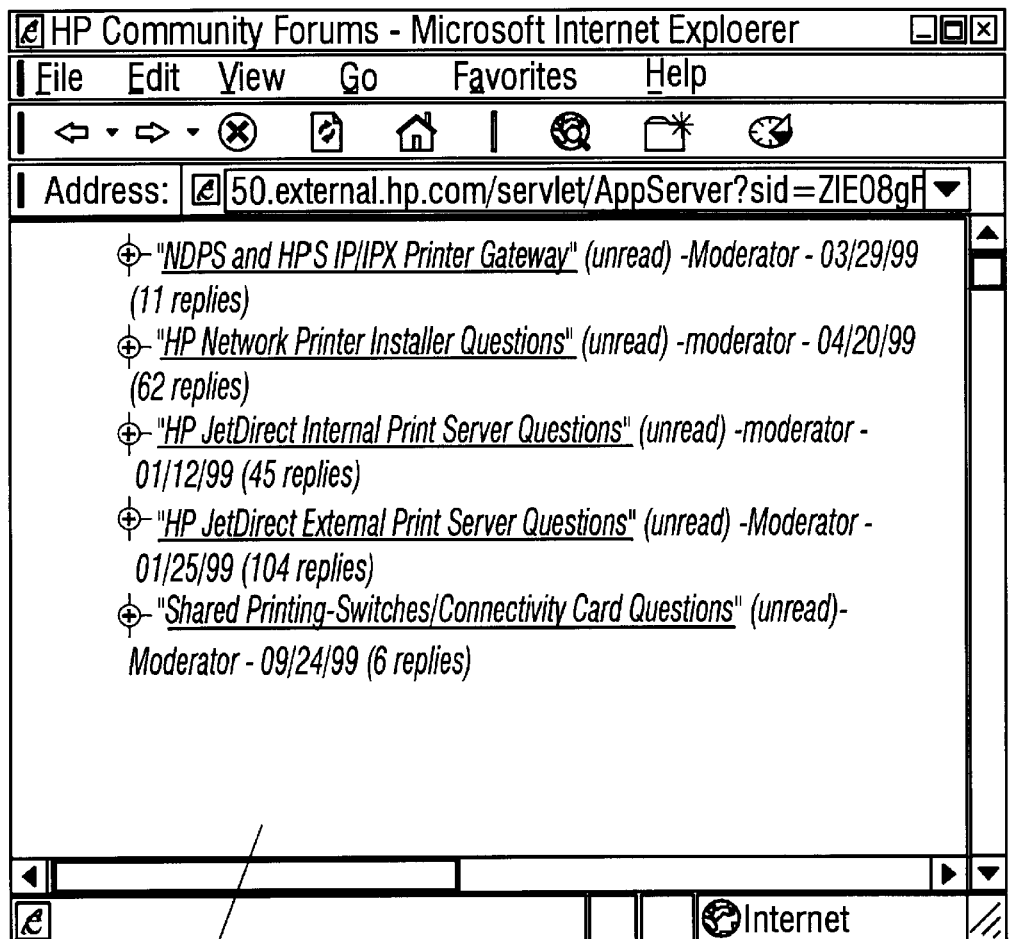

With reference to FIGS. 2A–2C and 3, an exemplary BIT tag in a forum web tool page will now be described. FIGS. 2A and 2B show an index web page from the "HP Network Printing Products" forum. The upper portion of the page is depicted in FIG. 2A; while the lower portion is shown in FIG. 2B. FIG. 2C shows the end section of the HTML source code for the web page that is depicted in FIGS. 2A and 2B. The BIT tag for this web page is highlighted at 210. Even though this tag is an image tag, it is configured so that the browser will not display an error graphic in response to the designated BIT image file failing to be returned to the browser. The blank region at 205 in FIG. 2B shows where such an graphic would otherwise appear. Thus, the use of BIT tags can effectively be transparent to a web user.

Figure 7A:
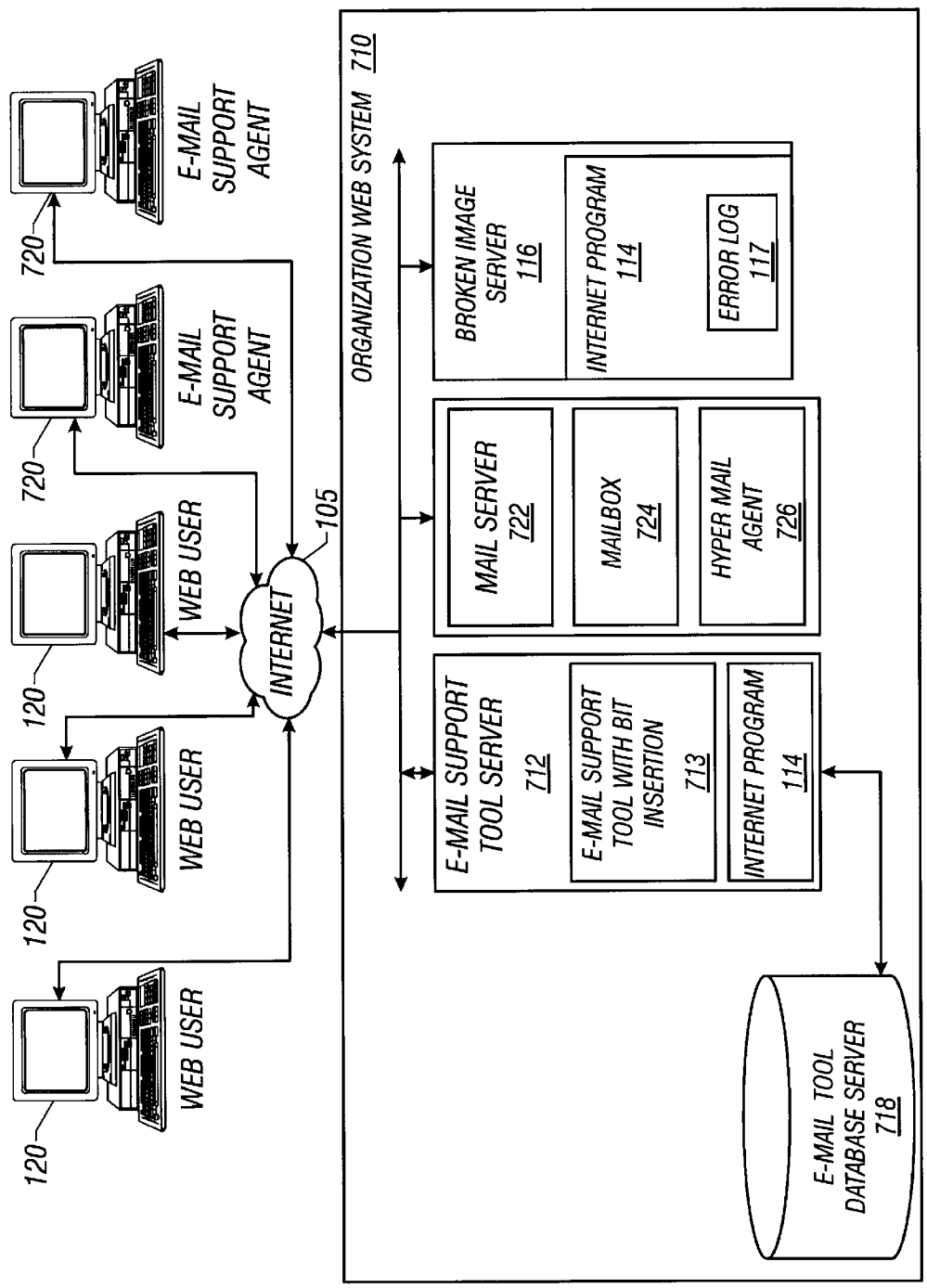
FIG. 7A shows a block diagram of another embodiment of a broken image tracking system of the present invention implemented in an e-mail support system.
Figures 1, 7B:
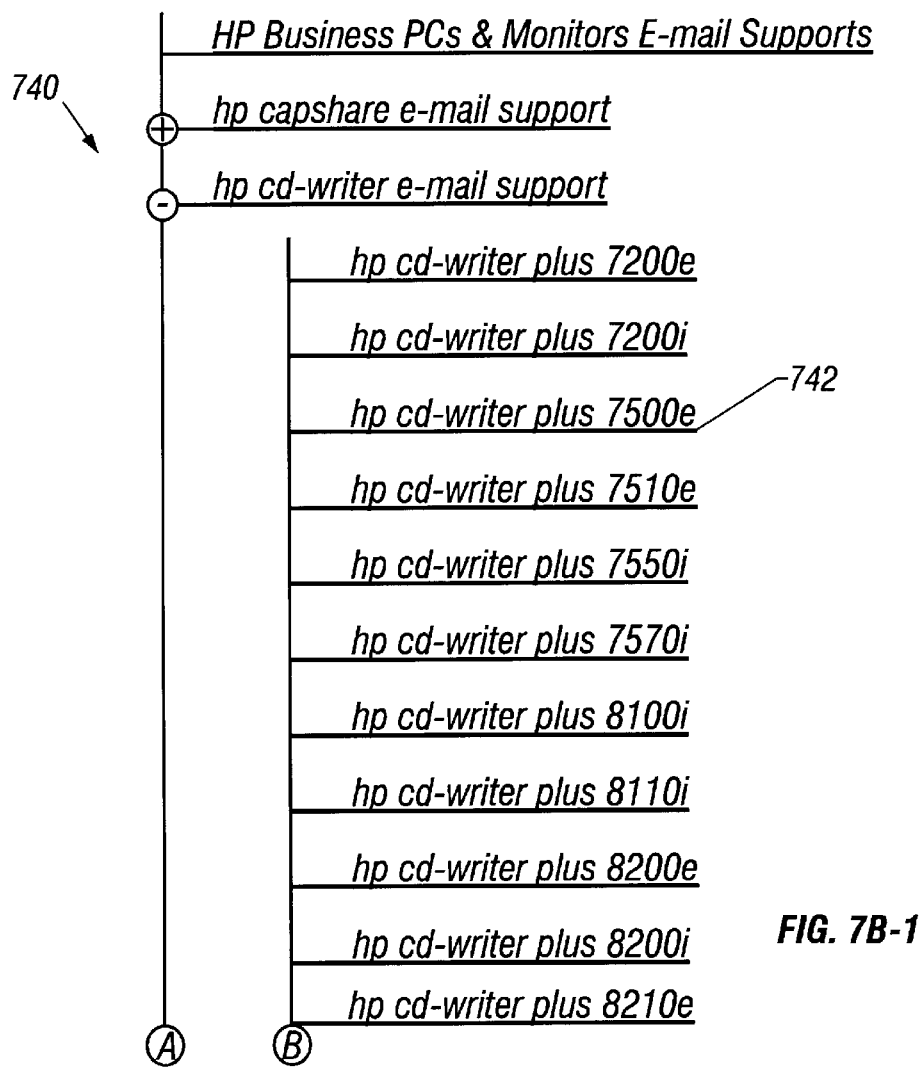
Figures 3, 7B:
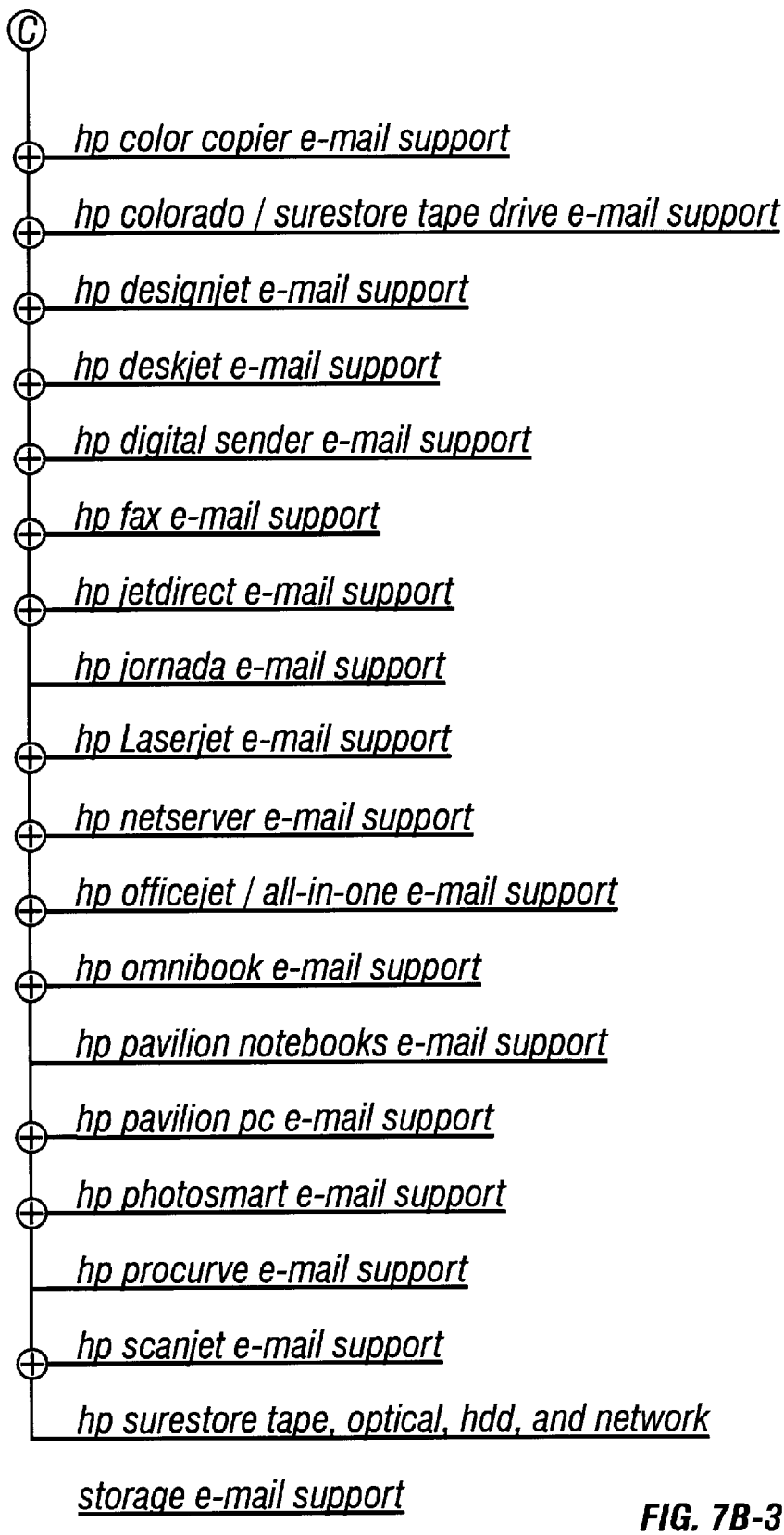

With reference to FIG. 3, the BIT image tag 210 is shown with its constituent components separately highlighted. BIT tag 210 generally includes an image tag identifier 305 a display size segment 310, a BIT URL 320, and a format segment 340. The image tag identifier, "img" at 305, is a HTML instruction that identifies the tag as an image tag. It generally causes a browser to retrieve and display the graphic file specified in the BIT URL 320. The display size segment 310 defines the allowable space that the specified graphic can occupy. In the depicted embodiment, the height and width are each set to one. This corresponds to a one by one pixel array allotment for the graphic, which effectively ensures that an error graphic will not appear on the user's screen. This is desirable because the designated image is a broken image and thus an image error will occur, which would otherwise cause the browser to display an image error graphic.

The next segment is the BIT URL 320. BIT URL 320 comprises the "SRC" identifier 321, broken image server address 323, port identifier 325, broken directory segment 327, embedded user information segments 329–337, and a broken image file 339. The SRC identifier 321 indicates to the browser that the server, file path and file to be displayed will follow. The broken image server address 323 identifies to the browser the name and location of the broken image server. In the depicted embodiment, it is at "http://hpcc981.external.hp.com." The port identifier 325 indicates the port for the broken image server. However, it is not actually required for the broken image server to be identified. The next segment is the broken directory segment 327. It is an arbitrary directory name that is ensured not to contain a graphic. Like the port identifier 325, the broken directory segment 327 is not required for proper operation.

The embedded user information segments 329 through 337 include—in a directory path format—various segments of user information relating to a user session with a web tool server. The "appid=jforum" segment 329 is an application identification segment. The particular application in this embodiment is "jforum", which corresponds to the exemplary user forum web tool. In this way, BIT URLs for various applications (or web tools) can be routed to, stored in, and separately retrieved from a common error log in a single broken image server. Of course, multiple broken image servers could also be readily used. The next segment 331 is the forum number segment, which in the depicted embodiment is "98." In the example, forum 98 corresponds to the network printing forum. In this example, there are over 150 separate forums—one for each product line that is available through the web site.

The next two segments, "forum" and "index_pl" (referenced together at 333) identify the specific web page file template transmitted to the user. Depending on where a user is at in the web tool (forum), these two segments will vary. For example, if a user were reading a message, it could be "forum/show." From segment 333, it can be seen that the user was in the index page, which corresponds to the forum web page of FIGS. 2A and 2B. It basically conveys what portion of the site the user is looking at in a particular instance of time. The "//" at 335 is an empty field. If a user had actually read a message in this web page, the number of the message would be in this field. The "_kpq8 Gfb" segment 337 is a unique session identifier. This identifier is randomly generated and assigned to a user for a given session. Each web page transmitted to the user for that session will include a BIT URL with the same session identifier.

The last segment 339 in the depicted BIT URL is the bogus image file designator, "broken.gif." It ensures that the broken image server actually looks for an image file. In turn, this ensures that an image error will occur since no such file will be found. Thus, segment 339 is the name of a bogus image file that may or may not exist—so long as it cannot be found if in fact it does exist. (It should be recognized, however, that a file need not necessarily be designated in the BIT URL—depending on the utilized internet programs for the web tool and broken image servers—in order to achieve proper BIT operation. That is, the BIT URL would not have to include the broken.gif segment 339 or any other file designation.) Format segment 340 is an html format instruction. In the depicted embodiment, "border=0" tells the browser not to include a border. This is similar to the height and width dimensions each being set to one in the display size segment 310.

FIG. 4 shows a portion of an exemplary error log. The depicted error log portion includes logged error messages, 401, 403, 405, and 407. Error messages 403 and 407 are broken image errors, and error messages 401 and 405 are conventional logged errors, which occurred within the natural course of operation in the broken image server. With reference to error message 401, each error message includes a time stamp section, an error indicator section, an affected client section, and an error type section. The time section indicates the date and time that the error was logged. The error indicator section conveys that an error was registered. The affected client section identifies the client for which the error occurred. Finally, the error type section conveys the type of error that was logged.

As seen in BIT error messages 403 and 407, when a BIT error is logged, the error type shows: "file does not exist." This is followed by the failed file path, which includes the embedded user information from the bit URL. In the depicted drawing, the user information is highlighted in italics. The "broken-images" segment serves as a preamble indicating the beginning of the user information.

In one embodiment, on a periodic basis (e.g. weekly), the error log can be mined for user information. A script or any other suitable program may be executed to look for user information within logged error messages. With the error log of FIG. 4, the search engine could simply search for embedded phrases beginning with "broken-images" and ending with "broken.gif." These phrases could be retrieved from the error log, and their associated error messages could be deleted. The retrieved messages could then be stored in any suitable database for desired analysis. The user information phrases could be stored as individual records, with their sections being individually indexable. This way, user information phrases could be sorted based on desired relationships such as common users, common applications, or similar time ranges. Persons of ordinary skill in the art will recognize, however, that the user information may be stored and used in any desired manner once it has been retrieved and stored in a central database. Alternatively, user information could also be initially retrieved based on desired grouping strategies from the error log itself.

Figure 5:
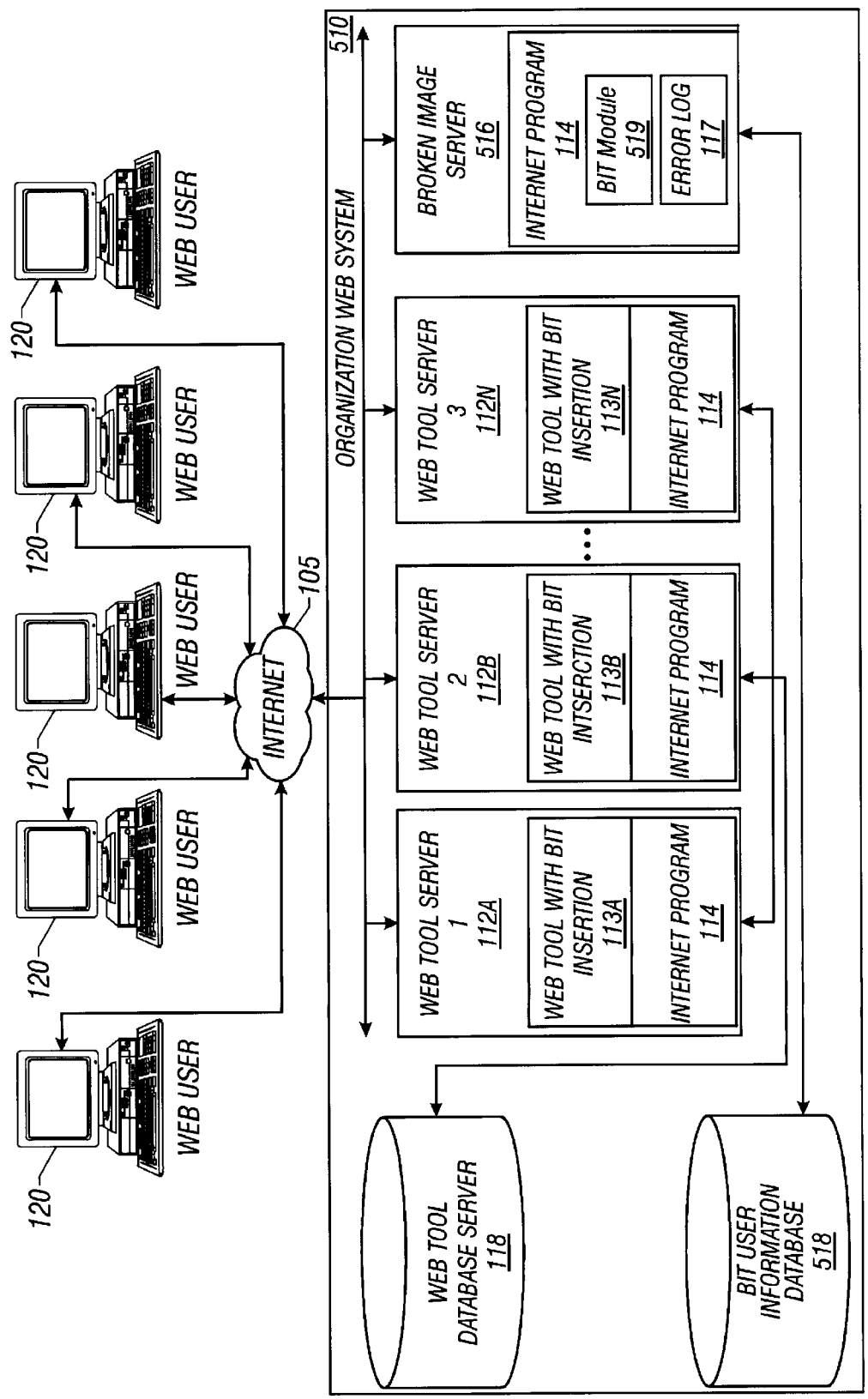
FIG. 5 shows a block diagram of an alternative embodiment of the BIT system of the present invention.

FIG. 5 shows one embodiment for implementing an alternative organization web system 510 of the present invention. Web system 510 generally includes web tool servers 112A–112N, web tool database server 118, broken image server 516, and a bit user information database 518. Web tool servers 112A–112N, along with web tool database server 118, function similarly to those previously described and depicted in FIG. 1. Broken image server 516, however, additionally includes BIT module 519, along with Internet program 114, and error log 117.

BIT module 519 is a program for identifying BIT error messages and routing their contained user information directly to BIT user information database 518 rather than storing them in error log 117. This provides two primary benefits. First, it enables user information to be automatically stored in BIT user information database 518 as the BIT URLs are coming into the BIT information server 516. This enables the user information to be more conveniently and efficiently accessible on a real-time basis. Second, by not storing BIT URLs in the error log 517 (or by renaming them quickly), it makes it easier for legitimate error messages to be processed from the error log, which would then not be cluttered with BIT error messages.

Figure 6:
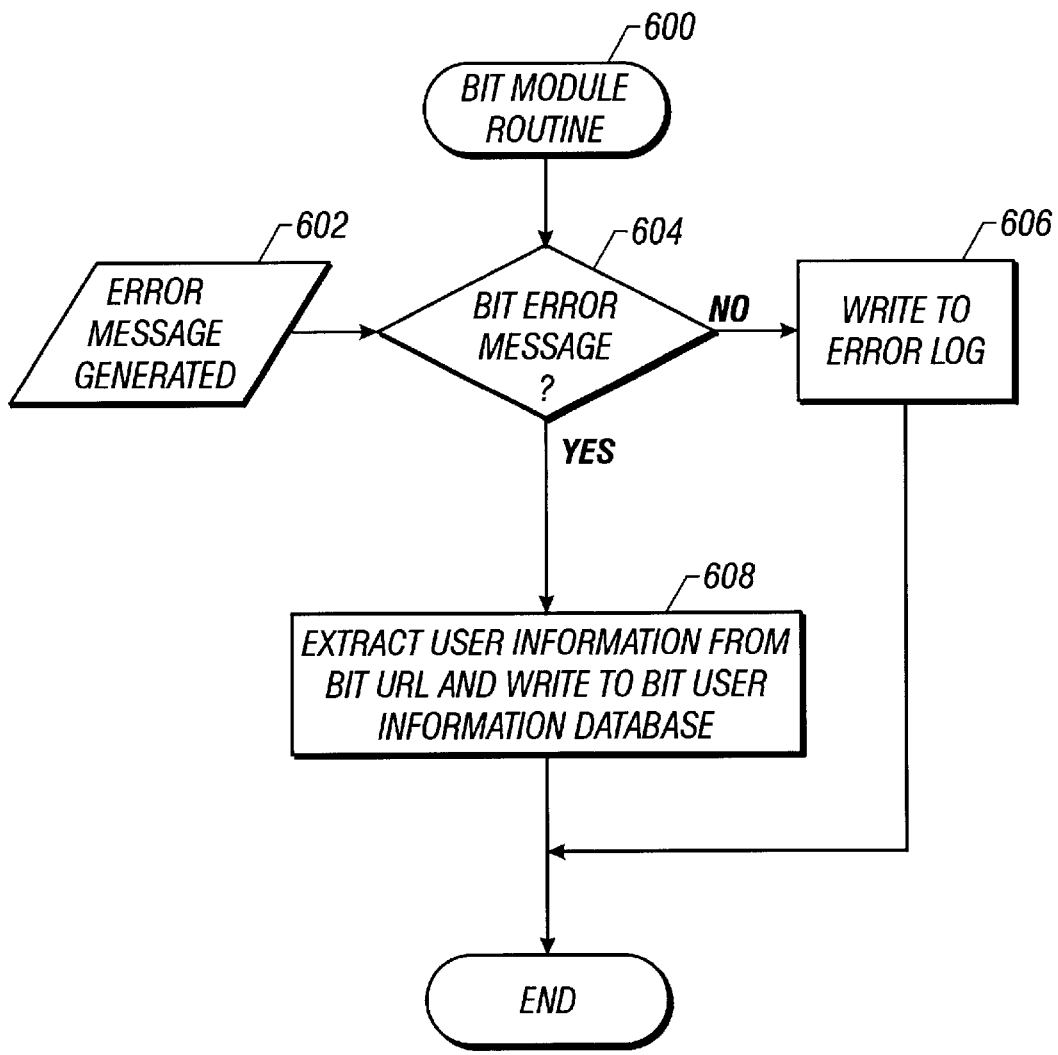
FIG. 6 shows one embodiment of a routine for implementing the BIT module within a BIT server of the present invention.

FIG. 6 shows one embodiment of a routine 600 for generally implementing a BIT module program. Within Internet program 114, when an error message is generated at step 602, the routine determines at 604 whether the error message is a BIT error message. If it is not, the error message is written to the error log 117 at step 606. On the other hand, if the error message is in fact a BIT error message, then its user information is extracted and conveyed to BIT user information database 518 at step 608. BIT module 519 (FIG. 5) may be implemented with any suitable programming scheme. As shown in the depicted embodiment, it is a module within (or on top of) Internet program 114. For example, if Internet program 114 is an Apache program, then BIT module 519 could be carried out with a Pearl script executing in cooperation with the Apache Internet enabling engine. However, persons of skill in the art will recognize that any suitable programming scheme will suffice.

BIT user information database 518 may be implemented with any suitable database scheme. For example, it may be implemented with an Oracle SQL-type database program. In this way, conventional SQL functions (e.g., update) could be incorporated into BIT module 519 for updating database 518. In addition, reports could be readily generated in response to a desired query. Moreover, BIT user information database 518 could store the user information according to any desired scheme. Information sections could be grouped based on timing, user session IDs, applications, or any other desired categorizations.

With reference to FIGS. 7A–7D, another embodiment of a tracking scheme of the present invention is presented for implementing an e-mail support tracking system. An e-mail support system can be used to provide customers, both actual and prospective, with requested information such as technical assistance in an efficient manner. Some systems are capable of parsing and matching customer (or user) inquiries to e-mail support agents based on their specific qualifications and experience. The support agents may work from within the organization's system, or—as is the case in the depicted embodiment—they may work independently outside of the organization accessing the system, for example, from the Internet. With the depicted e-mail support tracking scheme, an organization can not only track users making e-mail inquiries, but also, it can track the agents as to how well they are responding to the customer users.

FIG. 7A shows one embodiment of a block diagram of an organization web system (or at least a portion thereof) 710 operably connected via Internet 105 to web user computers 120 and e-mail support agent computers 720. Web system 710 generally includes e-mail support tool server 712, broken image server 116, and mail server 722, all communicatively linked to one another, as well as to web user computers 120 and e-mail support agent computers 720. Also included is e-mail tool database server 718 connected to e-mail support tool server 712 for storing e-mail support tool information. E-mail support tool server 712 may be implemented with a web tool server 112 as previously described. It includes an e-mail support tool with BIT insertion program 713 and an Internet program 114. Mail server 722 may be a conventional mail server and includes mailbox (e.g., POP3 mailbox) 724 and a hyper mail agent 726.

It should be recognized that while the servers are shown connected to each other and to the Internet from within the organization system, they could also be linked directly to the Internet or linked via any network, wired, wireless, or otherwise. This linking can be circuit switched, packet routed, electrical, optical, wireless, or partially of each. That is, with regard to the present invention, the particular structure for inter-connecting the various servers, user computers and agent computers is not critical so long as they can operably interact with each other. Along these lines, skilled artisans will recognize that there are numerous ways to implement servers and server/computer systems and/or networks. In turn, the various programs (e.g., database, Internet, mail support tool) may be executed in any suitable hardware configuration.

In operation a web user (via a web user computer 120) could access a mail support system through a web page such as the web page of FIGS. 7B-1, 7B-2, and 7B-3, which includes links 740 for receiving support on various e-mail support topics. As an example, if a user selected the link at 742, the "hp cd-writer plus 7500e e-mail support" form 744 of FIG. 7C would appear. The user would enter appropriate information in the various fields and submit the completed form as a query to the system, which causes it to be transmitted to the e-mail support tool server 712 (FIG. 7A).

Continuing in FIG. 7A, the submitted query (which in the depicted embodiment is in an HTML format) is then converted into an e-mail query with a suitable e-mail format (e.g., MIME incorporated e-mail message) by the e-mail support tool program 713. (MIME stands for Multipurpose Internet Mail Extensions. It is a common method for transmitting non-text files via Internet e-mail, which was originally designed for ASCII text. MIME encodes the files and decodes it back to its original format at the receiving end.) E-mail support tool program 713 also inserts a BIT tag, (see, e.g., the BIT tag shown in FIG. 7D) into the e-mail query and transmits the query, with the inserted BIT tag, to mail server 722. Mail server 722 deposits the e-mail query into mail box 724, where it is made available for servicing by an appropriate e-mail support agent 720.

E-mail support agent computers 720 (as well as the Web user computers 120) have e-mail applications that are appropriately compliant (e.g., MIME and HTML compliant) with the utilized e-mail query format. Thus, when the e-mail agent opens the e-mail query, the inserted BIT tag is executed, and the embedded BIT URL is routed to the broken image server 116, as described in previous sections. Broken image server 116 time-stamps the BIT URL and stores it in a database, such as error log 117. When the BIT URL has its own date/time-stamp indicating when the e-mail query was generated, the difference between these times roughly indicates the delay between when the e-mail query was generated and stored in the mail box 724, on the one hand, and when the agent opened it for processing on the other hand. This can easily be calculated under control of, for example, mail server 722, or by hyper mail agent 726.

In one embodiment, the agent's outgoing reply, which includes the original e-mail query, is blind copied to hyper mail agent 726, which executes the reply/email query in order to cause the BIT tag to once again be executed and routed to broken image server 116. In this way, the organization can also track the time taken by the agent to actually respond to the web user's query. When the reply/e-mail query is received and opened by the web user, the BIT tag is once again executed—this time by the web user's e-mail application—causing the BIT URL to again be routed to broken image server 116. In this way, with the original e-mail query being carried throughout the overall e-mail support process, the same BIT tag may be executed and routed to the broken image server several times (e.g., three times as just described), thereby leaving a time marked trail for tracking the entire process.

Figure 7D:
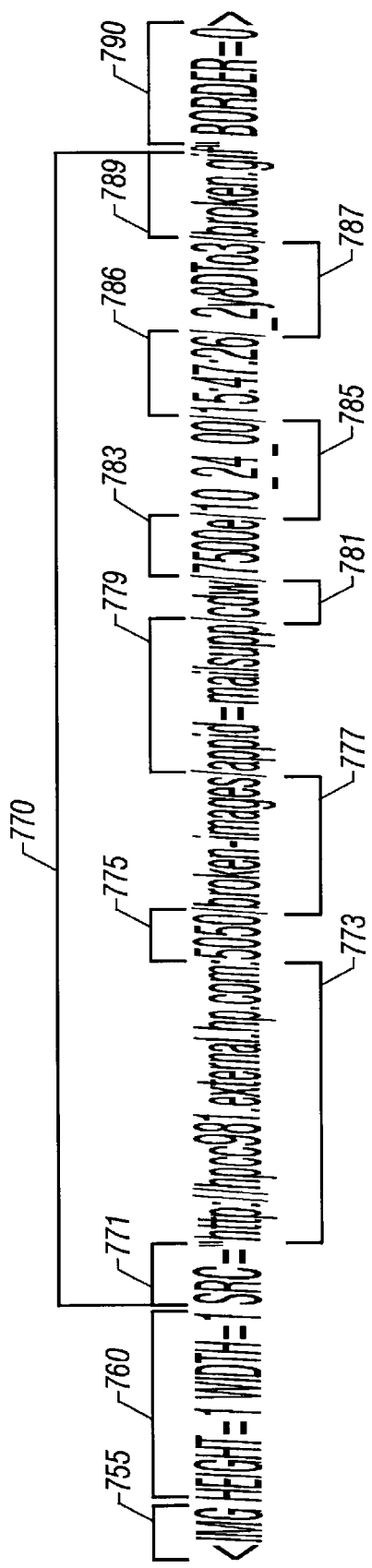
FIG. 7D shows an exemplary BIT tag for the e-mail support system of FIGS. 7A–7C.

With reference to FIG. 7D, an exemplary BIT tag is shown for the depicted e-mail support system. The BIT tag generally includes an image tag identifier 755, a display size segment 760, a BIT URL 770, and a format segment 790. The BIT URL 770 comprises an "SRC" identifier 771, broken image server address 773, port identifier 775, broken directory segment 777, embedded user information segments 779–787, and a broken image file designation 789. Because these segments——other than the embedded user information segments, 779–787—have already been addressed in the section relating to FIG. 3, the following discussion will be limited to the embedded user information segments 779–787.

Embedded user information segments 779 through 787 include various segments of user (or query) information relating to a particular query for tracking the query throughout the e-mail support system process. The "appid= mailsupp" segment 779 is an application identification segment. The particular application in this embodiment is "mailsupp", which corresponds to the exemplary e-mail support web tool. Remember that a common database (e.g., broken image server error log, SQL database) may be used for receiving and storing embedded user information for multiple web tool applications. The next two segments, 781 and 783, are the particular support department identifier segments. In the depicted embodiment, these segments are "cdw" and "7500e", respectively. They indicate that the user selected the mail support form for information relating to Hewlett Packard's 7500e series CD writers. The next two segments, "10_24_00" and "15:47:26," referenced at 785 and 786, are respectively the date and time segments for indicating the data and time that the e-mail query was generated at the e-mail support tool server 712. This approximately corresponds to the time when the user submitted the support request. The last segment, "_2y8DTo3" at 787 is a unique, randomly-generated query identifier for identifying a particular query.

With the exemplary e-mail support tracking system of FIGS. 7A–7D, an organization can track the various time increments (e.g., from generation to receipt by an agent, from receipt to response to a user) throughout the servicing of an e-mail support request. Once the BIT tag is inserted into an e-mail query, it will normally be passed along and executed each time the query is replied or forwarded to a receiving party.

Other metrics can also be tracked and/or used with this general scheme. For example, within the e-mail support server 712, query ID segments could be correlated with actual user identification information in order to follow up with selected users. In addition, various methods could be used to not only anonymously track agent performance, but also, to track specific agents. For example, in one embodiment, specific agents may be linked to specific support departments. Thus, by knowing the support system department (through an appropriate query information segment), the servicing agent could be identified. In another embodiment, an agent identification segment could be incorporated into the BIT URL. The e-mail support server could "mail" the query to an appropriate mailbox in the mail server that corresponds to the agent. Persons of skill will recognize that numerous other tracking techniques could be employed based on the teachings presented herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for tracking the use of an enterprise resource, comprising:
    eliciting from a user a query in connection with providing a particular resource to said user;
    generating from the elicited query a corresponding query, said corresponding query including a command having embedded query information associated with said elicited user's query; and
    making said generated query available to an agent for a response thereto, wherein the agent has a computer that executes said embedded command when said generated query is opened by the agent, the execution of said embedded command causing the agent computer to transmit to a server, designated within said embedded command, a server request that includes the embedded query information, the server request comprising a request for retrieving a non-existent file from said server; and
    storing the query information as an error record in an error log in response to an error being generated by said server when said server fails to find said non-existent file, said error record being distinguishable from other error records to facilitate tracking use of the enterprise resource.

2. The method of claim 1 wherein said embedded command comprises a mark up language image tag.

3. The method of claim 1 wherein said command transmitted to said server includes a broken image tracking tag with the query information embedded in a broken image tracking URL.

4. The method of claim 1 wherein said eliciting step includes the step of providing to the user a web page with a form having one or more fields for defining the query.

5. The method of claim 1 wherein the query information is stored in an error log within said designated server.

6. The method of claim 1 wherein said server request is a request for retrieving an image file from said server, said server having a program with an error log, wherein the received request generates an error message within said error log when said image file is not found by the server, the method further including:
    the steps of identifying the request in response to said generated error message; and
    storing the query information in a database that is separate from said error log.

7. The method of claim 1 wherein the step of making said generated query available to said agent for a response thereto includes the step of:
    depositing said generated query in a mailbox of a mail server and providing said agent with access to said generated query.

8. The method of claim 1 wherein said queries are e-mails delivered over a community shared network, and wherein the step of making said generated query available to an agent for a response thereto includes sending an e-mail query to the agent via said network.

9. The method of claim 8 wherein said query information includes date and time information for tracking when said generated query is responded to by the agent.

10. The method of claim 9 wherein said agent is remote from said enterprise, the method further including the step of:
    opening said e-mail query with a hyper mail agent residing within said enterprise when said agent replies to said generated query in order to track when said generated query is responded to by the agent.

11. A system for tracking web users use of an e-mail support system, comprising:
    an e-mail support tool server operably connected to one or more web user computers, the e-mail support tool server having an e-mail support tool program for receiving support system queries from the one or more web user computers, the e-mail support tool server generating an e-mail query from each received support system query and inserting within each e-mail query a command having embedded query information;
    one or more e-mail support agent computers operably connected to the e-mail support server for receiving and opening the e-mail queries, and
    a designated server operably connected to the one or more support agent computers, wherein the command within an e-mail query is executed by a support agent computer when the e-mail query is opened by a support agent computer causing said support agent computer to transmit to the designated server a request that includes the embedded query information from the command within the e-mail query, the request comprising a request for retrieving a non-existent file, the query information being stored as an error record in an error log in response to an error being generated by said designated server when said server fails to find said non-existent file, said error record being distinguishable from other error records to facilitate tracking use of the e-mail support system.

12. The system of claim 11 wherein the request includes a broken image tracking URL with a designated broken image file that cannot be found within the designated server, which causes the error to be generated by the Internet program.

13. The system of claim 11 wherein the designated server includes a program for implementing a web server with the error log, wherein the user information is stored in a database separate from the error log.

14. The system of claim 11 wherein the e-mail support tool server and designated server are implemented in the same computer.

15. A method for tracking the use of a support service, comprising:

eliciting from a user a query in connection with providing said support service;

generating from the elicited query a corresponding reply query that includes a command having embedded query information associated with the user's elicited query;

making said reply query available to an agent, as well as to said user, so that said agent can responsively reply to said user; and executing in a computer controlled by said user said command when said reply is opened by said user, the execution of said command causing the user computer to transmit to a server designated within said command, a request that includes the embedded query information, the request comprising a request for retrieving a non-existent file, and causing said query information to be stored as an error record in an error log in response to an error being generated when said non-existent file is not found, said error record being distinguishable from other error records to facilitate tracking use of the support system.

16. A system for keeping track of the usage of multiple resources provided from multiple locations, said system comprising:

means for receiving user requests for a particular resource;

means for processing said user requests, said processing means including means for providing a message to said user, said message containing at least one command exercisable by a user controlled processor located remote from said processing means; and means at said user controlled processor and operable under control of said command for sending to a location remote from said user a request for data, said location being identified in said provided message, and said data request containing information pertaining to received ones of said user requests, said data request comprising a request for retrieving a non-existent file, said data request not being able to be processed by said remote location so as to cause said remote location to generate an error record when said non-existent file is not found, said error record being distinguishable from other error records to facilitate tracking usage of the multiple resources.

17. A method for tracking use of resources, comprising:

receiving a query from a user;

converting the query into an e-mail message intended for an agent that will answer the query, the e-mail message comprising an embedded command that includes information pertaining to the query and an identification that that information is to be tracked, the command being configured to request a non-existent file when executed;

receiving a request for the non-existent file;

storing the information pertaining to the query and the identification in an error record of an error log; and identifying the error record from the error log such that the information pertaining to the query can be tracked.

18. The method of claim 17, wherein the embedded command comprises a broken image tracking tag.

19. The method of claim 17, wherein the request for the non-existent file is received as a result of the agent opening the e-mail message and thereby executing the embedded command.

20. The method of claim 17, further comprising time-stamping the received request and storing the time stamp in the error record.

21. The method of claim 17, further comprising receiving a second request for a non-existent file, the second request resulting from the agent sending a reply e-mail message to the user, and storing a second error record in the error log such that the information pertaining to the reply e-mail message can be tracked.

22. The method of claim 21, further comprising receiving a third request for a non-existent file, the third request resulting from the user opening the reply e-mail message from the agent, and storing a third error record in the error log such that the information pertaining to receipt of the reply e-mail message can be tracked.

23. The method of claim 22, further comprising associating each of the first, second, and third error records with each other so that they may be tracked as pertaining to a single transaction.

* * * * *